(12) United States Patent
Hsu et al.

(10) Patent No.: US 8,155,024 B2
(45) Date of Patent: Apr. 10, 2012

(54) SYSTEM AND METHOD FOR MANAGING NETWORK CONNECTIVITY OF A CPE USING A CMTS

(75) Inventors: Lu-Meng Hsu, Taipei Hsien (TW); Yew-Min Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 269 days.

(21) Appl. No.: 12/628,313

(22) Filed: Dec. 1, 2009

(65) Prior Publication Data
US 2011/0058491 A1 Mar. 10, 2011

(30) Foreign Application Priority Data
Sep. 9, 2009 (CN) .......................... 2009 1 0306808

(51) Int. Cl.
*G01R 31/08* (2006.01)
(52) U.S. Cl. ........ 370/252; 370/431; 725/111; 725/109; 725/120; 709/228; 709/221; 709/222
(58) Field of Classification Search .................. None
See application file for complete search history.

(56) References Cited

U.S. PATENT DOCUMENTS

| 7,523,482 | B2* | 4/2009 | Barrett et al. ................. 725/120 |
| 7,720,002 | B1* | 5/2010 | Beser ............................. 370/254 |
| 7,966,409 | B1* | 6/2011 | Daruwalla et al. ............ 709/228 |
| 2006/0262722 | A1* | 11/2006 | Chapman et al. ............. 370/229 |
| 2007/0153820 | A1* | 7/2007 | Gould .......................... 370/432 |
| 2008/0229379 | A1* | 9/2008 | Akhter ......................... 725/139 |
| 2009/0161769 | A1* | 6/2009 | Barrett et al. ............ 375/240.25 |
| 2010/0309813 | A1* | 12/2010 | Singh et al. ................... 370/254 |

* cited by examiner

*Primary Examiner* — Kibrom T Hailu
(74) *Attorney, Agent, or Firm* — Altis Law Group, Inc.

(57) ABSTRACT

A system and method can manage network connectivity of a customer premises equipment (CPE) using a cable modem termination system (CMTS). The CMTS connects to the CPE via a cable modem, and connects to a dynamic host configuration protocol (DHCP) server via a network. The CMTS includes a connection unit that is operable to inform the CPE to request the DHCP server to get a new internet protocol (IP) address when the cable modem changes a radio frequency (RF) channel to different IP domains, and control the CPE to communicate with the CMTS according to the new IP address.

15 Claims, 3 Drawing Sheets

SYSTEM AND METHOD FOR MANAGING NETWORK CONNECTIVITY OF A CPE USING A CMTS

BACKGROUND

1. Technical Field

Embodiments of the present disclosure relate generally to network communication management systems and methods, and more particularly to a system and method for managing network connectivity of a customer premises equipment (CPE) using a cable modem termination system (CMTS).

2. Description of Related Art

In a data over cable service interface specification (DOCSIS) system, several radio frequency (RF) channels exists in one coaxial cable. A cable modem uses one of these RF channels to transmit data. Normally, an Internet Protocol (IP) domain of each of the RF channels is different. A customer premises equipment (CPE) obtains a unique IP address from a dynamic host configuration protocol (DHCP) server when the cable modem connects to different RF channels. The connectivity of a CPE may breakup after a RF channel is changed to different IP domains.

In the DOCSIS system, there exists a management gap between a cable modem termination system (CMTS) and the CPE and the CMTS. The cable modem can connect to a network, but the CPE can not connect to the network through the cable modem. The RF channel may be changed, but the CPE connected behind the cable modem does not acknowledge what happen. The CPE will lose network connectivity if the CPE keeps an original IP address after the cable modem changes the RF channel with different IP domains.

Accordingly, there is a need for a system and method for managing network connectivity of a customer premises equipment using the CMTS, so as to overcome the above-mentioned problems.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
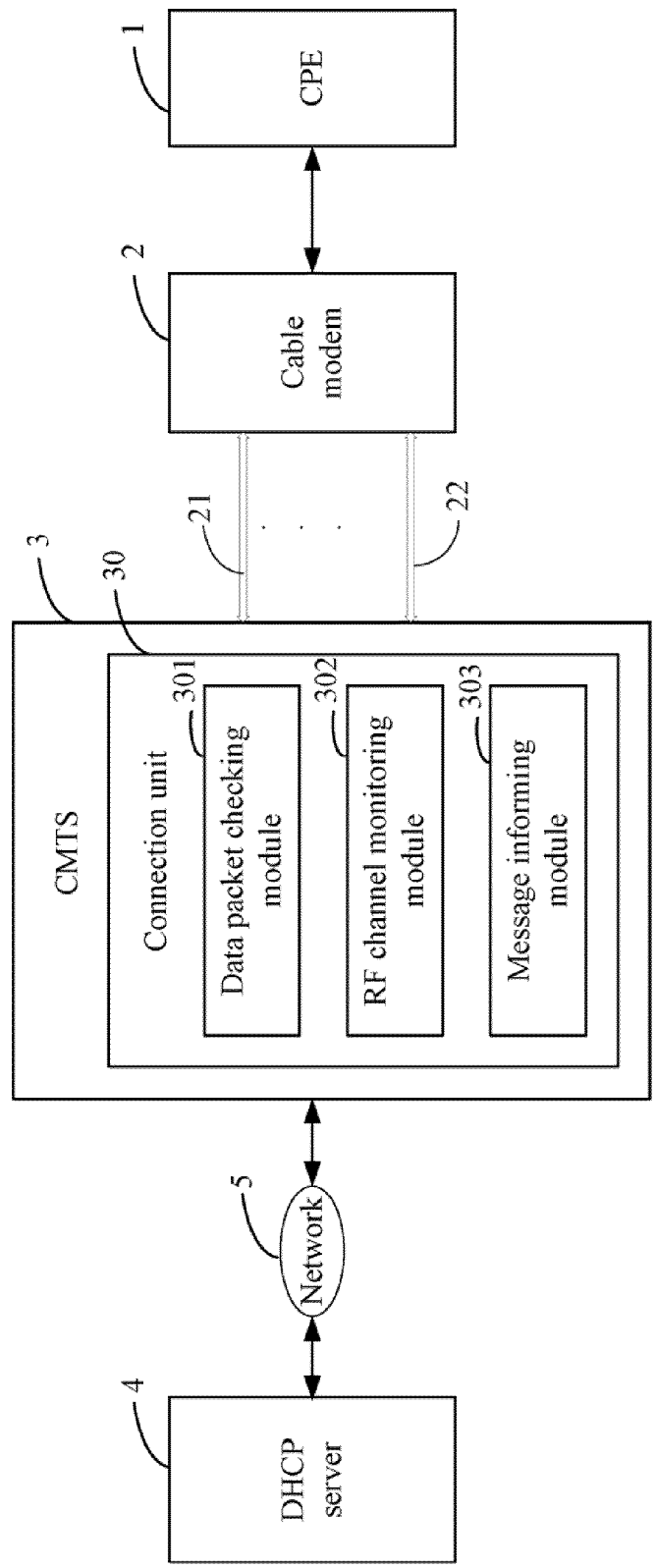
FIG. 1 is a schematic diagram of one embodiment of a system for managing network connectivity of a customer premises equipment.

FIG. 1 is a schematic diagram of one embodiment of a cable modem termination system (CMTS) 3 for managing network connectivity of a customer premises equipment (CPE) 1. In the embodiment, the CMTS 3 connects to the CPE 1 via a cable modem 2, and connects to a dynamic host configuration protocol (DHCP) server 4 via a network 5. The CPE 1 can communicate with the CMTS 3 through the cable modem 2. The cable modem 2 may connect to the CMTS 3 through several radio frequency (RF) channels, such as a first RF channel 21 and a second RF channel 22, for example.

Each of the RF channels corresponds to an Internet Protocol (IP) address, such as 140.113.23.175, for example. The DHCP server 4 allocates one IP address to the CPE 1 when the CPE 1 communicates with the CMTS 3. During the network communication process, data packets may be transferred through one of the RF channels between the CMTS 3 and the cable modem, and then sent to the CPE 1 through the cable modem 2. In one embodiment, the CMTS 3 is a dominator in the network management system 10, and each of the data packets may be passed through the CMTS 3. The network 5 may be the Internet, an intranet, or any other suitable communication network system.

In one embodiment, the CMTS 3 may include a connection unit 30. The connection unit 30 is operable to inform the CPE 1 to obtain a new IP address (e.g., 210.32.34.23) from the DHCP server 4 when the cable modem 2 changes the RF channel to different IP domains, and control the CPE 1 to communicate with the CMTS using the new IP address. Thereby, the CPE 1 will not lose network connectivity after the cable modem 2 changes different IP domains. In the embodiment, the connection unit 30 may include a data packet checking module 301, an RF channel monitoring module 302, and a message informing module 303. One or more computerized codes of the function modules 301-303 may be stored in a storage device of the CMTS 3, and executed by at least one processor of the CMTS 3. In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. The modules described herein may be implemented as either software and/or hardware modules and may be stored in any type of computer-readable medium or other storage device.

The data packet checking module 301 is operable to receive a data packet from the network 5, and determine whether the data packet is a request message from the CPE 1. The data packet may include a message type, a destination IP address, and a size of the data packet. In one embodiment, the request message may be dented as "DHCP-ACK" request, which is used to request the DHCP server 4 to allocate the new IP address (i.e., 210.32.34.23) to the CPE 1 when the cable modem 2 changes the RF channel to different IP domains. The data packet checking module 301 records related information of the request message if the data packet is a request message from the CPE 1. Otherwise, the data packet checking module 301 handles the data packet normally if the data packet is not a request message from the CPE 1.

The RF channel monitoring module 302 is operable to monitor an RF channel (e.g., the first RF channel 21 or the second RF channel 22) between the cable modem 2 and the CMTS 3, determine whether the RF channel has changed to another RF channel. In one embodiment, the cable modem 2 changes from the first RF channel 21 to the second RF channel 22. The RF channel monitoring module 302 is further operable to check whether the related information of the request message exists in the CMTS 3 if the RF channel has changed to another RF channel.

The message informing module 303 is operable to generate a response message according to the request message and send the response message to the CPE 1, if the related information of the request message exists in the CMTS 3. In one embodiment, the response message may be denoted as "DHCP-NAK" response. The CPE 1 acknowledges that the cable modem 2 has changed from the RF channel to another IP RF channel to communicate with the CMTS 3 when the CPE 1 receives the DHCP-NAK response from the CMTS 3.

The message informing module 303 is further operable request the DHCP server 4 to allocate a new IP address for the CPE 1, such as 210.32.34.23, for example. Then the CPE 1 can communicate with the CMTS 3 through the network 5 with the new IP address.

Figure 2:
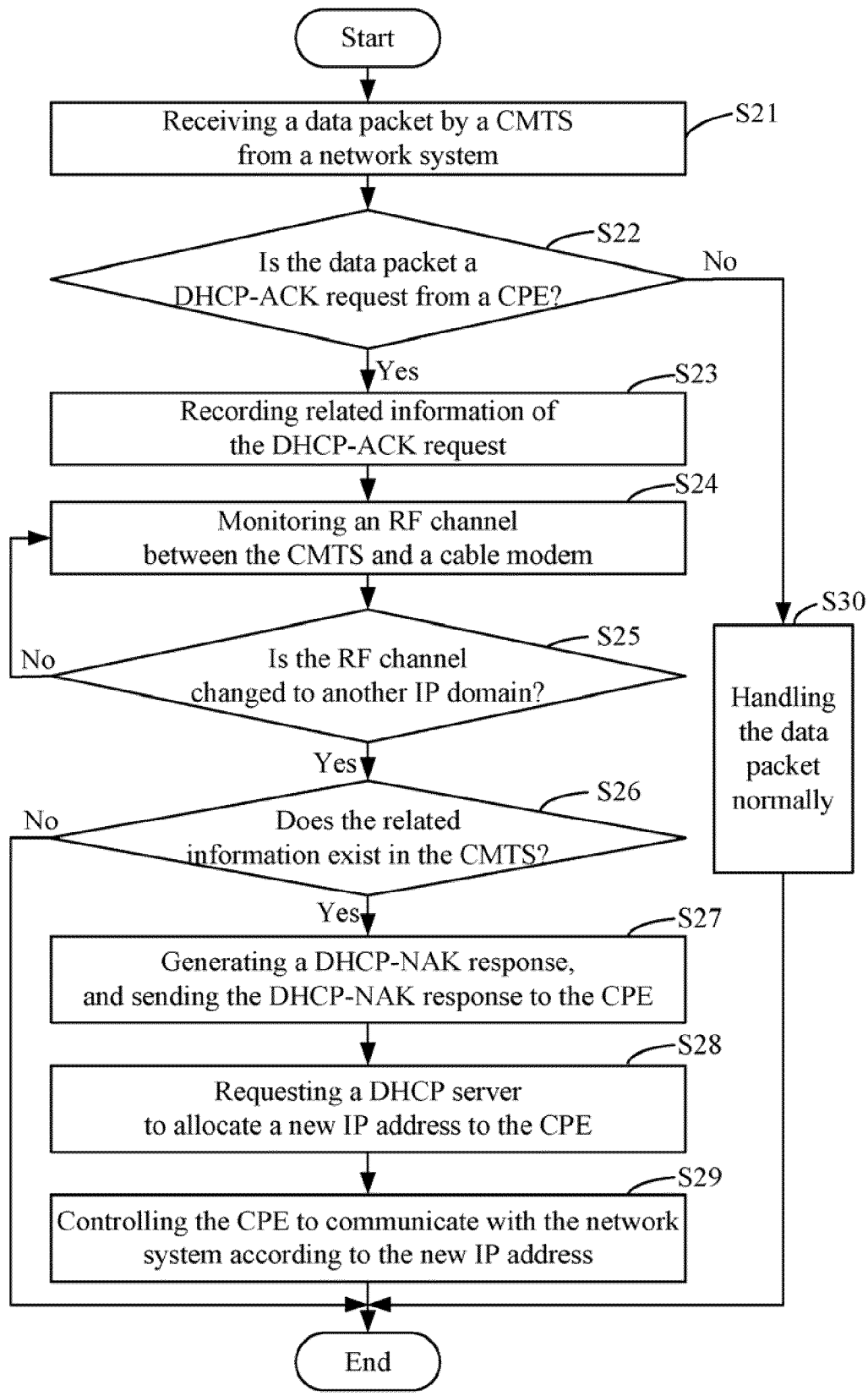
FIG. 2 is a flowchart of one embodiment of a method for managing network connectivity of a customer premises equipment by using the system of FIG. 1.

FIG. 2 is a flowchart of one embodiment of a method for managing network connectivity of a customer premises equipment by using the CMTS 3 as described in FIG. 1. Depending on the embodiment, additional blocks may be added, others removed, and the ordering of the blocks may be changed.

In block S21, the data packet checking module 301 receives a data packet from the network 5. In one embodiment, the CMTS 3 is a dominator in the network management system 10, and the data packet may be passed through the CMTS 3. The data packet may include a message type, a destination IP address, and the size of the data packet.

In block S22, the data packet checking module 301 determines whether the data packet is a request message from the CPE 1. In one embodiment, the request message may be dented as "DHCP-ACK" request, which is used to request the DHCP server 4 to allocate a new IP address (e.g., 210.32.34.23) for the CPE 1 when the cable modem 2 changes the RF channel to different IP domains. If the data packet is a request message from the CPE 1, in block S23, the data packet checking module 301 records related information of the request message. Otherwise, in block S30, the data packet checking module 301 handles the data packet normally if the data packet is not a request message from the CPE 1.

In block S24, the RF channel monitoring module 302 monitors an RF channel (i.e., a first RF channel 21 or a second RF channel 21) between the cable modem 2 and the CMTS 3. In block S25, the RF channel monitoring module 302 determines whether the RF channel has changed to another RF channel. In block S26, the RF channel monitoring module 302 checks whether the related information of the request message exists in the CMTS 3 if the RF channel has changed to another RF channel. For example, the cable modem 2 changes the first RF channel 21 to the second RF channel 22. If the RF channel has not changed to another IP domain, the flow returns to block S24 as described above.

If the related information of the request message exists in the CMTS 3, in block S27, the message informing module 303 generates a response message according to the request message, sends the response message to the CPE 1. In one embodiment, the response message may be denoted as "DHCP-NAK" response. The CPE 1 acknowledges that the cable modem 2 has changed the RF channel to another RF channel to communicate with the CMTS 3 when the CPE 1 receives the DHCP-NAK response from the CMTS 3. If the related information of the request message does not exist in the CMTS 3, the flow goes to end.

In block S28, the message informing module 303 requests the DHCP server 4 to allocate a new IP address to the CPE 1, such as 210.32.34.23, for example. In block S29, the CPE 1 communicates with the network 5 through the CMTS 3 according to the new IP address.

Figure 3:
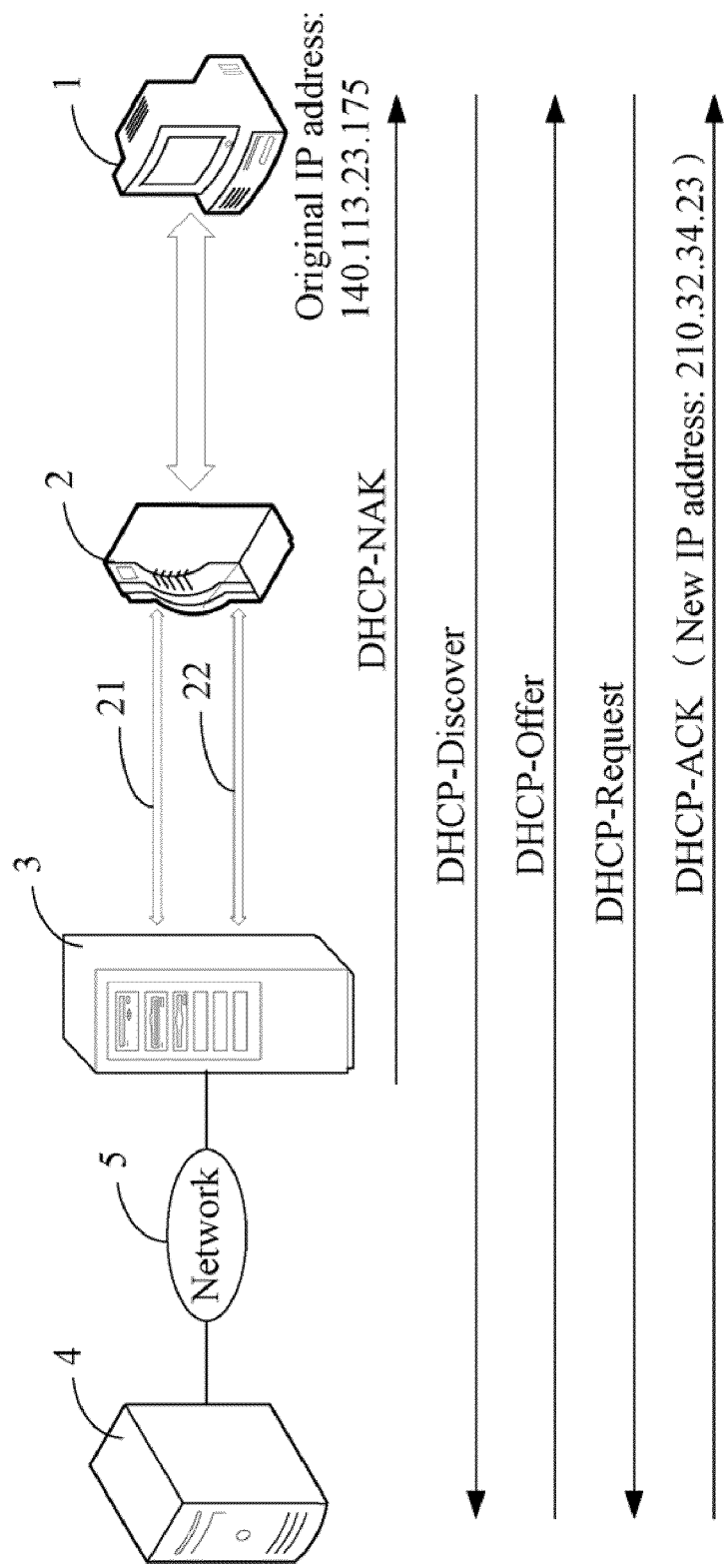
FIG. 3 is a schematic diagram illustrating an example for managing network connectivity of a customer premises equipment by using the system of FIG. 1.

FIG. 3 is a schematic diagram illustrating an example for managing network connectivity of a customer premises equipment by using the CMTS 3. In the example with FIG. 3, the CPE 1 communicates with the network 5 using the CMTS 3 according to an original IP address, such as 140.11.23.175. When the cable modem 2 changes the first RF channel 21 to the second RF channel 22, the CPE 1 requests the DHCP server 4 to allocate a new IP address (e.g., 210.32.34.33) through the CMTS 3.

In one embodiment, the connection unit 30 of the CMTS 3 generates a DHCP-NAK message to inform the CPE 1 that the first RF channel 21 has changed to the second RF channel 22. After the CPE 1 receives the DHCP-NAK response from the CMTS 3, the CPE 1 sends a DHCP-Discover message to the DHCP server 4. The DHCP server 4 responds to the DHCP-Discover message by sending a DHCP-Offer message to the CPE 1 when the DHCP-Discover message is received. Then the CPE 1 sends a DHCP-Request message to request the DHCP server 4 to allocate a new IP address corresponding to the second RF channel 22. After the DHCP-Request message is received, the DHCP server 4 sends a DHCP-ACK response to the CPE 1, and allocates a new IP address to the CPE 1, such as 210.32.34.23. As such, the CPE 1 can communicate with the network 5 through the CMTS 3 according to the new IP address.

All of the processes described above may be embodied in, and fully automated via, functional code modules executed by one or more general purpose processors of computing devices, such as the CMTS 3. The functional code modules may be stored in any type of readable medium or other storage devices. Some or all of the methods may alternatively be embodied in specialized the computing devices.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A cable modem termination system (CMTS) for managing network connectivity of a customer premises equipment (CPE), the CMTS being connected to the CPE via a cable modem and connected to a dynamic host configuration protocol (DHCP) server via a network, the CMTS includes one or more functional code modules executed by at least one processor to perform the managing network connectivity, the at least one or more functional code modules comprising:

a data packet checking module operable to receive a data packet from the network, determine whether the data packet is a request message from the CPE, and record related information of the request message if the data packet is a request message from the CPE, or handle the data packet normally if the data packet is not a request message from the CPE;

a radio frequency (RF) channel monitoring module operable to monitor an RF channel between the cable modem and the CMTS, determine whether the RF channel has been changed to anther RF channel, and check whether the related information of the request message exists in the CMTS if the RF channel has been changed to anther RF channel; and a message informing module operable to generate and send a response message to the CPE according to the request message if the related information of the request message exists in the CMTS, request the DHCP server to allocate a new internet protocol (IP) address to the CPE, and control the CPE to communicate with the network according to the new IP address.

2. The CMTS according to claim 1, wherein the cable modem connects to the CMTS through a plurality of RF channels, and each of the RF channels corresponds to one IP address.

3. The system according to claim 1, wherein the data packet comprises a message type, a destination IP address, and a size of the data packet.

4. The CMTS according to claim 1, wherein the request message is a DHCP-ACK request that is used to request the DHCP server to allocate the new IP address to the CPE when the cable modem changes the RF channel to different IP domains.

5. The CMTS according to claim 1, wherein the response message is a DHCP-NAK response that is used to inform the CPE that the RF channel has changed to another RF channel.

6. A method for managing network connectivity of a customer premises equipment (CPE) using a cable modem termination system (CMTS) via a cable modem, the method comprising:
receiving a data packet by the CMTS from a network system;
determining whether the data packet is a request message from the CPE;
recording related information of the request message if the data packet is a request message from the CPE, or handling the data packet normally if the data packet is not a request message from the CPE;
monitoring an RF channel between the cable modem and the CMTS;
determining whether the RF channel has been changed to another RF channel;
checking whether the related information of the request message exists in the CMTS if the RF channel has been changed to another RF channel;
generating a response message according to the request message and sending the response message to the CPE if the related information of the request message exists in the CMTS;
requesting a dynamic host configuration protocol (DHCP) server to allocate a new internet protocol (IP) address to the CPE; and
controlling the CPE to communicate with the network system according to the new IP address.

7. The method according to claim 6, wherein the cable modem connects to the CMTS through a plurality of RF channels, and each of the RF channels corresponds to one IP address.

8. The method according to claim 6, wherein the data packet comprises a message type, a destination IP address, and a size of the data packet.

9. The method according to claim 6, wherein the request message is a DHCP-ACK request that is used to request the DHCP server to allocate the new IP address to the CPE when the cable modem changes the RF channel to different IP domains.

10. The method according to claim 6, wherein the response message is a DHCP-NAK response that is used to inform the CPE that the RF channel is changed to another RF channel.

11. A non-transitory storage medium having stored thereon instructions that, when executed by a processor of a cable modem termination system (CMTS), cause the CMTS to perform a method for managing network connectivity of a customer premises equipment (CPE) connecting to a cable modem, the method comprising:
receiving a data packet by the CMTS from a network system;
determining whether the data packet is a request message from the CPE;
recording related information of the request message if the data packet is a request message from the CPE, or handling the data packet normally if the data packet is not a request message from the CPE;
monitoring an RF channel between the cable modem and the CMTS;
determining whether the RF channel has been changed to another RF channel;
checking whether the related information of the request message exists in the CMTS if the RF channel has been changed to another RF channel;
generating a response message according to the request message and sending the response message to the CPE if the related information of the request message exists in the CMTS;
requesting a dynamic host configuration protocol (DHCP) server to allocate a new internet protocol (IP) address to the CPE; and
controlling the CPE to communicate with the network system according to the new IP address.

12. The storage medium according to claim 11, wherein the cable modem connects to the CMTS through a plurality of RF channels, and each of the RF channels corresponds to one IP address.

13. The storage medium according to claim 11, wherein the data packet comprises a message type, a destination IP address, and a size of the data packet.

14. The storage medium according to claim 11, wherein the request message is a DHCP-ACK request that is used to request the DHCP server to allocate the new IP address to the CPE when the cable modem changes the RF channel to different IP domains.

15. The storage medium according to claim 11, wherein the response message is a DHCP-NAK response that is used to inform the CPE that the RF channel is changed to another RF channel.

* * * * *